(12) United States Patent
Garner

(10) Patent No.: US 6,311,393 B1
(45) Date of Patent: Nov. 6, 2001

(54) ASSEMBLY FOR ATTACHING FASTENERS TO A BELT

(76) Inventor: James M. Garner, 4912 SE. 3rd Ave., Durant, OK (US) 74701

( * ) Notice: Subject to any disclaimer, the term of this patent is extended or adjusted under 35 U.S.C. 154(b) by 0 days.

(21) Appl. No.: 09/382,859

(22) Filed: Aug. 25, 1999

(51) Int. Cl.⁷ .............................. B23P 11/00; B23P 19/00
(52) U.S. Cl. ........................................ 29/798; 29/243.51
(58) Field of Search .............................. 29/243.51, 432.1, 29/798, 243.56, 243.5; 227/155, 153, 147

(56) References Cited

U.S. PATENT DOCUMENTS

| | | | |
|---|---|---|---|
| D. 328,749 | 8/1992 | Womack | D15/127 |
| 1,740,180 | 12/1929 | Larson . | |
| 1,853,928 | 4/1932 | Purple . | |
| 2,899,680 | 8/1959 | Potter . | |
| 2,908,008 | 10/1959 | Potter . | |
| 3,044,074 | 7/1962 | Tebb et al. . | |
| 3,101,481 | * 8/1963 | Neale | 29/243.51 |
| 3,962,754 | 6/1976 | Stolz | 24/33 B |
| 4,023,239 | 5/1977 | Stolz | 24/33 P |
| 4,050,138 | 9/1977 | Stolz | 29/243.51 |
| 4,151,634 | 5/1979 | Stolz | 29/509 |
| 4,315,349 | 2/1982 | Stolz | 24/33 C |
| 4,427,190 | 1/1984 | Stolz | 269/32 |
| 4,517,737 | 5/1985 | Sulzle | 29/798 |
| 4,522,329 | 6/1985 | Stolz | 227/153 |
| 4,538,755 | * 9/1985 | Schick | 29/243.51 |
| 4,653,156 | 3/1987 | Stolz et al. | 24/33 R |
| 4,681,359 | 7/1987 | Stolz | 294/81.21 |
| 5,018,262 | 5/1991 | Wheatcroft | 29/243.51 |
| 5,020,209 | 6/1991 | Fullard et al. | 29/564.8 |
| 5,038,442 | 8/1991 | Stolz et al. | 24/33 P |
| 5,170,924 | * 12/1992 | Musil | 29/243.51 |
| 5,236,079 | 8/1993 | Herold | 198/844.2 |
| 5,238,169 | * 8/1993 | Herold | 29/243.51 |
| 5,341,545 | 8/1994 | Herold | 24/33 P |
| 5,368,214 | * 11/1994 | Schick | 29/243.51 |
| 5,415,913 | 5/1995 | Clevenger, Jr. | 428/58 |
| 5,544,801 | * 8/1996 | Schick | 29/243.51 |
| 5,553,359 | 9/1996 | Herold | 24/33 P |
| 5,644,836 | * 7/1997 | Schick | 29/243.51 |
| 5,680,688 | 10/1997 | Garner | 29/243.51 |
| 6,056,183 | * 5/2000 | Tanabe | 227/155 |
| 6,081,995 | * 7/2000 | Herold | 29/243.51 |

* cited by examiner

Primary Examiner—S. Thomas Hughes
Assistant Examiner—Marc Jimenez
(74) Attorney, Agent, or Firm—Head, Johnson & Kachigian

(57) ABSTRACT

An assembly for attaching U-shaped belt fasteners to the end of an elongated flat belt in which each belt fastener has first and second opposed leg portions with an integral bight portion therebetween and with at least one fastening wire extending from the first leg portion and a wire receiving opening in the second leg portion, the assembly including an elongated alignment member having a forward face with openings therein to receive the fastening wires of a plurality of belt fasteners and to hold the belt fasteners in an open position allowing the end of a belt to be inserted between the legs of the plurality of belt fasteners and an elongated anvil member having a forward face configured so that when the anvil member is displaced towards the alignment member the legs of the belt fasteners are bent towards each other to capture the belt therebetween, openings being provided in the alignment member to receive a punch by which the fastening wires can be driven through the belt.

6 Claims, 6 Drawing Sheets

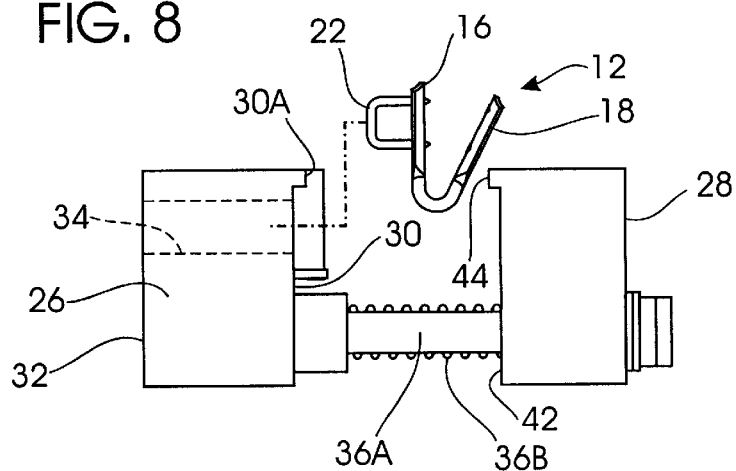
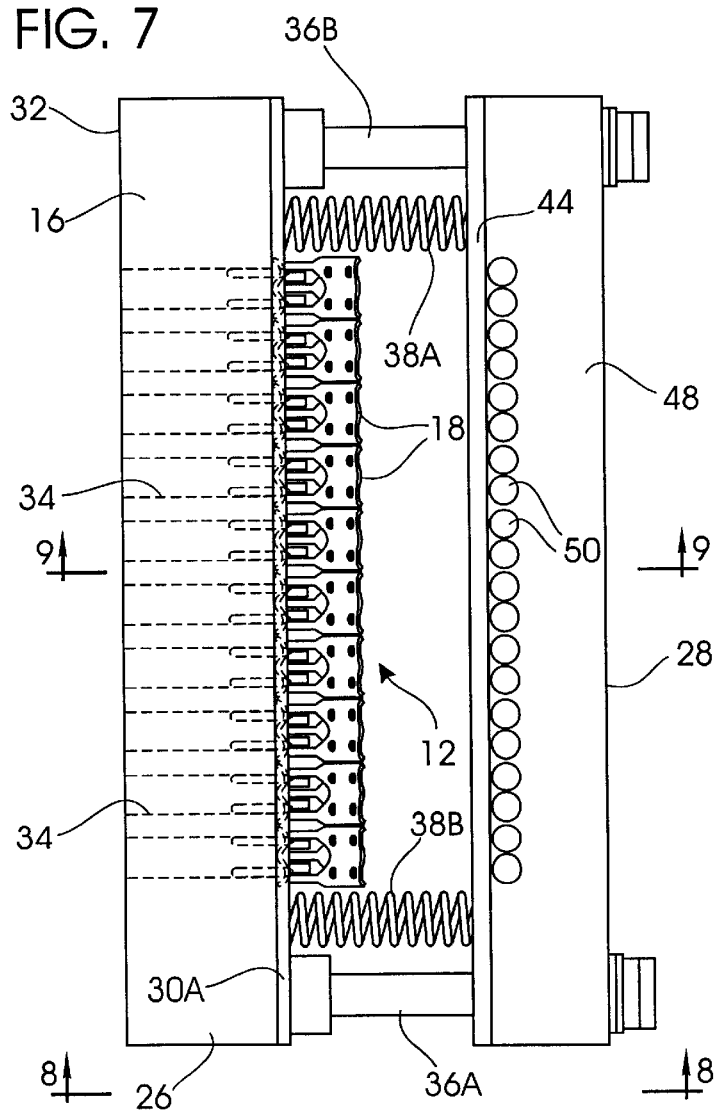

ASSEMBLY FOR ATTACHING FASTENERS TO A BELT

REFERENCE TO PENDING APPLICATIONS

This application is not related to any pending United States or international patent application.

REFERENCE TO MICROFICHE APPENDIX

This application is not referenced in any Microfiche Appendix.

BACKGROUND OF THE INVENTION

A primary application of the invention herein is for use in repairing belts on farm equipment and, particularly, for repairing belts used on hay balers. A common type of hay baler in use today employs a number of paralleled, spaced apart belts onto which hay is moved and rotated until a large round bale is formed. After a bale is formed it is dumped from the baler and a new bale is started. The typical round hay baler uses from six to eight belts and the belts can vary in width from about 6 to about 12 inches.

The belts used on a round hay baler are subject to substantial stress and wear. A problem encountered by farmers or others that use round hay balers is that of repairing a belt when it breaks. If a farmer is operating a round hay baler and a belt breaks, the belt must be repaired before baling of hay can be resumed. If the farmer is required to take the broken belt to a repair shop, substantial delay can be expected since a repair shop may be many miles from the hayfield where the baler is in use at the time the belt breaks. If the farmer has facilities and equipment at his home or base of operation he can take the belt there for repair but even this may occasion substantial delay in that frequently farmers have hay baling operations that are not immediately adjacent to their home or workshop where belt repair facilities may be readily available.

U.S. Pat. No. 5,680,688 entitled, "PORTABLE APPARATUS FOR AFFIXING A LACER TO A BELT", James M. Garner, inventor, that issued on Oct. 28, 1997 discloses a portable apparatus for use in repairing belts, and more specifically, provides a portable apparatus for affixing a lacer assembly to one end of a belt. U.S. Pat. No. 5,680,688 is incorporated herein by reference.

Belts of the type used in hay balers typically are formed of a long length of flexible material having opposed ends. At each opposed end of the long length of belt a lacer assembly is attached. A lacer assembly is formed of a plurality of paralleled metal belt fasteners. The typical belt fastener hook is a unitaly length of metal in a generally U-shaped configuration with a loop or bight portion between opposed legs. When a lacer assembly made up of a plurality of belt fasteners is attached to the end of a belt, the belt fasteners function as a way to secure the ends of the belt together. That is, with a belt fastener assembly at each end of a belt, the fasteners are aligned so that the hooks or bight portions of each of the belt fasteners interweave with each other. A rod extended through the interweaved bight portions secures the belt end to end.

The present invention provides an improved alignment member and an improved anvil for use in portable belt lacers.

For background information relating to belt lacing machines that are useable for repairing wide, flat belts, reference may be had to the following United States Patents:

| PAT. NO. | INVENTOR | TITLE |
| --- | --- | --- |
| D328,749 | Womack | Belt Lacer |
| 1,740,180 | Larson | Belt Lacing Machine |
| 1,853,928 | Purple | Belt Fastener Applying Machine |
| 2,899,680 | Potter | Belt-Fastening Machines |
| 2,908,008 | Potter | Belt-Fastening Machines |
| 3,044,074 | Tebb et al | Belt Lacing Machines |
| 3,962,754 | Stolz | Plate Connectors for Belts |
| 4,023,239 | Stolz | Coupling Rod for Connecting the Ends of a Conveyor Belt |
| 4,050,138 | Stolz | Apparatus for Attaching Connectors to the Ends of a Conveyor Belt |
| 4,151,634 | Stolz | Plate Connector for Conveyor Belts and Method for Securing Such Plate Connector to Conveyor Belts |
| 4,315,349 | Stolz | Connecting Strip for Conveyor Belts |
| 4,427,190 | Stolz | Apparatus for Pressure Attaching Conveyor Belt Connectors |
| 4,517,737 | Sulzle | Apparatus for Securing Connectors to a Fabric |
| 4,522,329 | Stolz | Apparatus for Pressing-In Belt Connectors |
| 4,653,156 | Stolz et al. | Convector for Conveyor Belting |
| 4,681,359 | Stolz | Belt Gripping Device |
| 5,018,262 | Wheatcroft | Belt Splicing Apparatus |
| 5,020,209 | Fullard | Belt Lacing and Cutter Assembly |
| 5,038,442 | Stolz et al. | Coupling Device Including a Hinge Pin for Interconnecting Conveyor Belt Ends |
| 5,236,079 | Herold | Belt Fastener Arrangement |
| 5,238,169 | Herold | Apparatus for Fastening Belt Ends |
| 5,341,545 | Herold | Belt Fastening Arrangement |
| 5,415,913 | Clevenger, Jr. | Method of Splicing Round Baler Belts |
| 5,553,359 | Herold | Fastener for Conveyor Belts |

BRIEF SUMMARY OF THE INVENTION

This invention provides an assembly for attaching U-shaped belt fasteners to the end of an elongated flat belt. An apparatus for affixing a lacer to a belt is disclosed in U.S. Pat. No. 5,680,688 entitled, "PORTABLE APPARATUS FOR A AFFIXING A LACER TO A BELT" by James M. Garner, inventor, that issued on Oct. 28, 1997. This patent teaches a system for attaching a lacer to a belt in which jaws are positioned in a vice-like apparatus so that the jaws can be moved together to secure the lacer to the end of a flat belt. The patent utilizes a mechanical system for forcing jaws together and the present invention provides improved jaws for holding belt attachment members and for closing the attachment members on a belt in the process of repairing the belt. The present invention is particularly useful for new and improved types of U-shaped belt fasteners that are attached to the end of an elongated flat belt in which each of the belt fasteners has a first and an opposed second leg portion with an integral bight portion therebetween. Each of the first leg portions has extending from it at least one fastening wire and each second leg portion has at least one opening at the outer end thereof for receiving the fastener wire or wires.

The assembly forming this invention includes an elongated alignment member having a vertical forward face having a plurality of closely spaced fastening wire openings. The first leg portion of each of the belt fastener is detachably supported in juxtaposed relationship on the alignment member forward face with at least one fastening wire of each belt fastener extending in a fastening wire opening. The second leg portion of each of the plurality of belt fasteners extend outwardly and upwardly from the alignment member forward face to permit the end of a flat belt to be inserted therein.

An elongated anvil member is positioned adjacent the alignment member. The anvil member has a vertical forward face that is parallel to the alignment member forward face. The alignment member and the anvil member are movable towards each other meaning that either one or both of the alignment member and anvil member are movable with respect to the other. In a preferred arrangement of practicing the invention, the alignment member and anvil member are positioned in a vice-like apparatus so that they can be forced together using mechanical force such as supplied by a hydraulic jack as disclosed in the previously mentioned U.S. Pat. No. 5,680,688.

A punch that has a forward portion telescopically receivable within the fastening wire opening of the alignment member is used to drive the fastening wires through a belt and through the opening in the second leg portion of each of the belt fasteners. In one embodiment the outer end of each of the fastening wires is, after passing through the opening in the second leg portion, bradded by engagement with the anvil member so as to securely retain a belt captured between the first and second leg portions of each belt fastener. In another embodiment the fastening wires are longer and extend for a length through the opening in the second leg portion of each of the belt fasteners. By means of a punch that telescopically is positionable through vertical openings formed in the anvil member, the fastening wires are bent to securely retain the end portion of a belt between the opposed legs of each fastener member.

A better and more complete understanding of the invention will be obtained from the following description of the preferred embodiments and the claims, taken in conjunction with the attached drawings.

DESCRIPTION OF THE DRAWINGS

FIG. 1 shows the ends of the belt having been provided with belt fasteners, each of which has a bight portion. Extending between opposed bight portions is a rod by which the ends of the belt are secured together to provide an endless belt of the kind used on hay balers.

The belt fastener of FIGS. 3–6 is a commercial device that is on the market and is not a part of this invention but instead, this invention is concerned with an assembly for attaching the belt fastener of FIGS. 3–6 to the end of a belt.

FIG. 7 is a top plan view of an assembly of this invention for attaching U-shaped belt fasteners, such as the type illustrated in FIGS. 3–6, to a belt.

FIG. 8 is an end view of the assembly as taken along the line 8—8 of FIG. 7 showing an attachment member of the type illustrated in FIGS. 3–6 as employed with the assembly.

Figure 9:
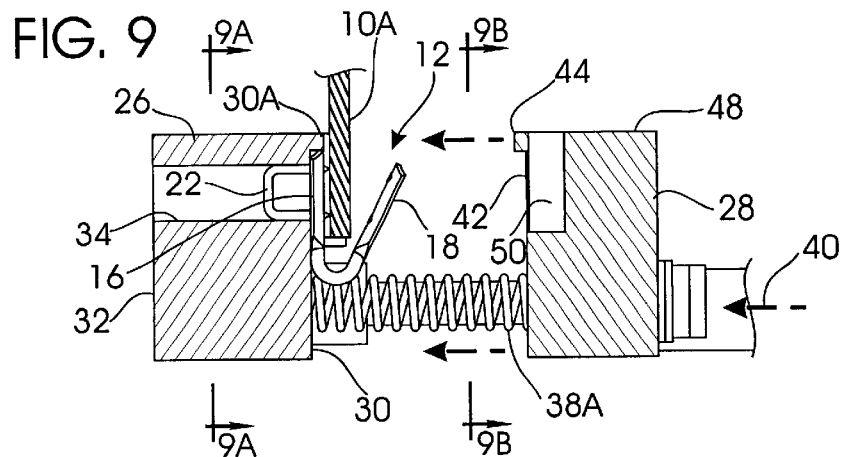

FIG. 9 is a cross-sectional view taken along the line 9—9 of FIG. 7 showing a belt fastener positioned in the alignment member and showing the end portion of a belt as positioned with respect to the belt fastener prior to securing the belt fastener to the belt.

Figure 9A:
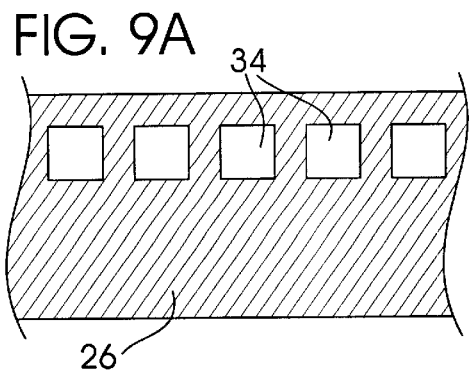

FIG. 9A is a fragmentary elevational cross-sectional view as taken along the line 9A—9A of FIG. 7.

Figure 9B:
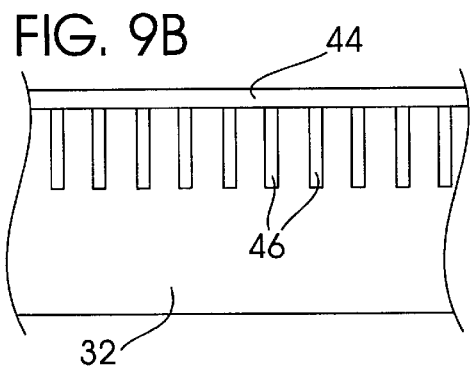

FIG. 9B is a fragmentary elevational view of the front face of the anvil member as taken along the line 9B—9B of FIG. 9.

Figure 10:
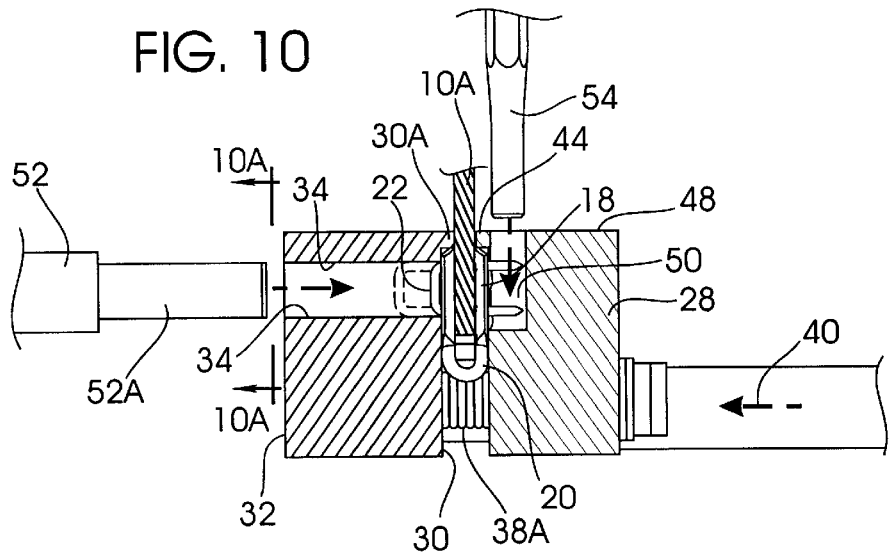

FIG. 10 is an elevational cross-sectional view of the assembly in FIG. 9 with the alignment member and anvil member forced in juxtaposed positions to secure belt fasteners to the end portion of a belt. FIG. 10 shows punches as employed in the assembly.

Figure 10A:
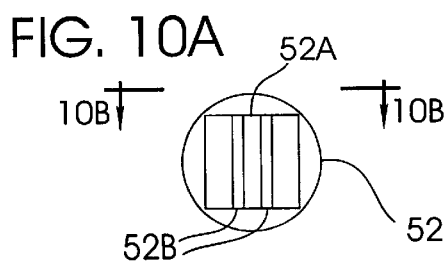

FIG. 10A is an enlarged end view of one of the punches employed in the assembly taken along the line 10A—10A of FIG. 10.

Figure 10B:
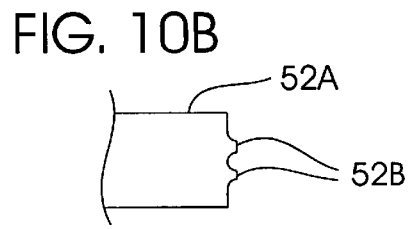

FIG. 10B is a top plan view of the end portion of the punch as shown in FIG. 10 as taken along the line 10B—10B of FIG. 10A.

Figure 1:
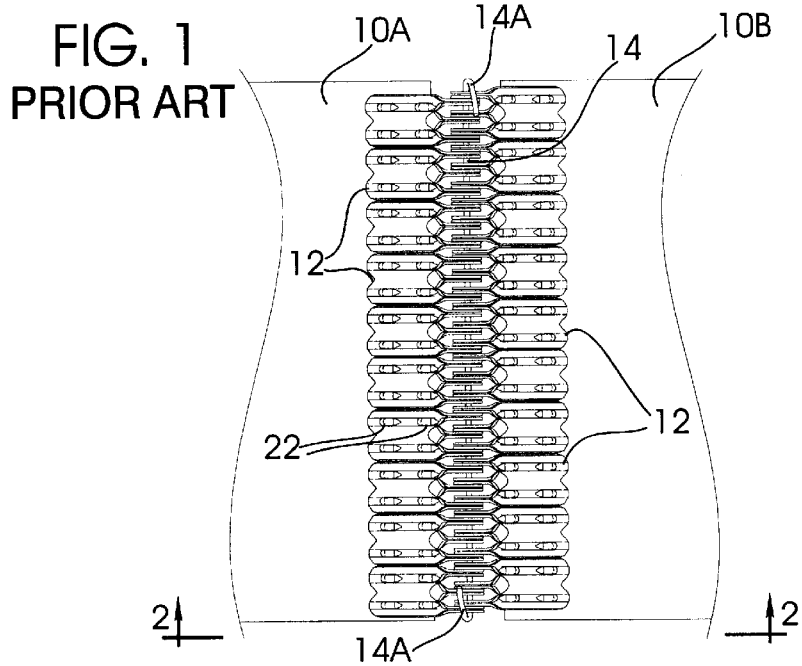
FIG. 1 is a fragmentary view of two end portions of a relatively wide, flat belt, such as the type customarily employed in hay balers that produce large round bales of hay.
Figure 2:
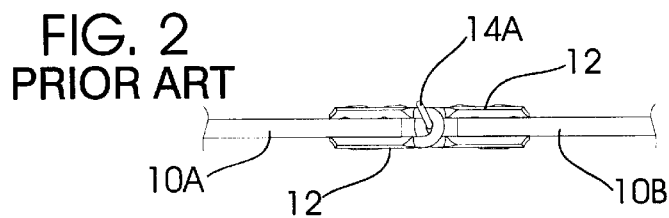
FIG. 2 is a fragmentary elevational side view as taken along the line 2—2 of FIG. 1.
Figure 11:
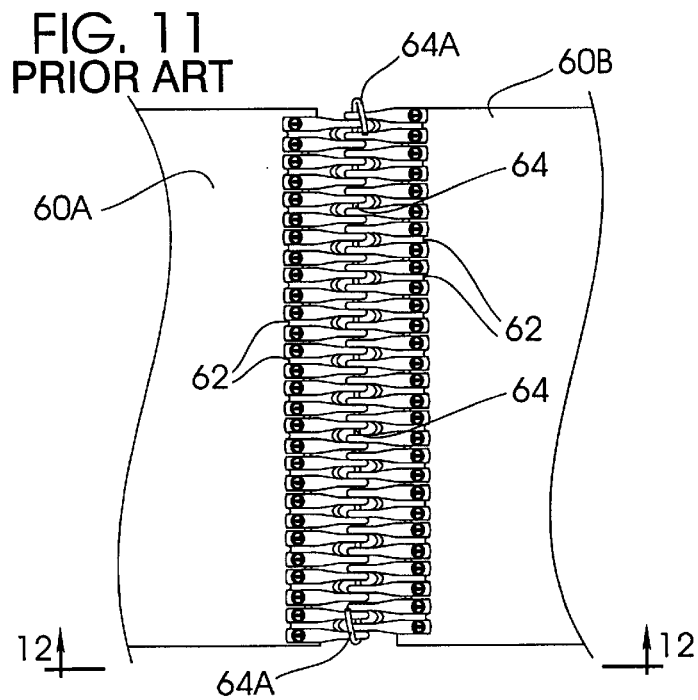

FIG. 11 is a top plan view, similar to that shown in FIG. 1, showing opposed end portions of a flat wide belt connected to each other by an attachment system that makes use of a different type of belt fastener.

Figure 12:
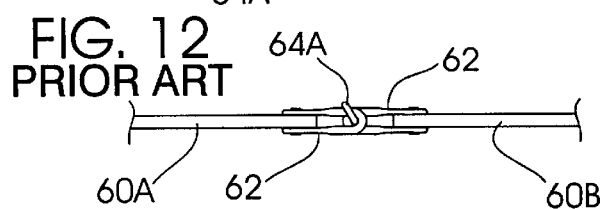

FIG. 12 is an elevational side view as taken along the line 12—12 of FIG. 11.

Figure 13:
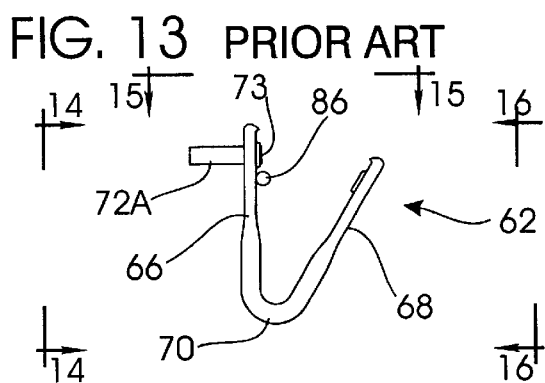

FIG. 13 is an elevational end view of a type of belt fastener as employed in FIGS. 11 and 12, the belt fastener of FIG. 13 accomplishing exactly the same purpose but being of a different form than the belt fastener of FIGS. 3–6.

Figure 14:
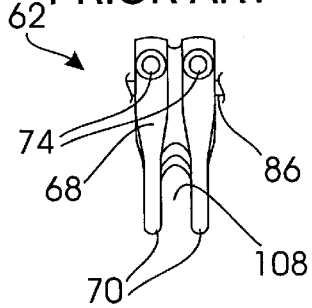

FIG. 14 is an elevational side view of the belt fastener as taken along the line 14—14 of FIG. 13.

Figure 15:
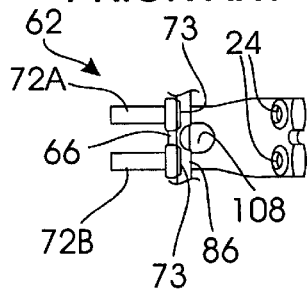

FIG. 15 is a top plan view of the belt fastener as taken along the lines 15—15 of FIG. 13.

Figure 16:
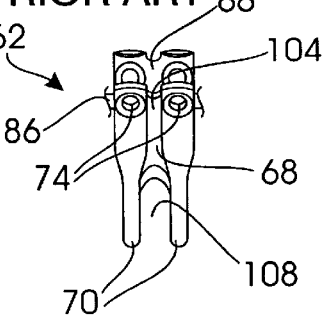

FIG. 16 is an elevational view of the opposite side of the belt fastener as taken along the lines 16—16 of FIG. 13.

The belt fastener illustrated in FIGS. 13–16 and as attached to the ends of a belt in FIGS. 11 and 12 is a commercially available device and not a part of this invention. Instead, this invention is an assembly for attaching the belt fastener of FIG. 13 through 16 to the end of a wide flat belt.

Figure 17:
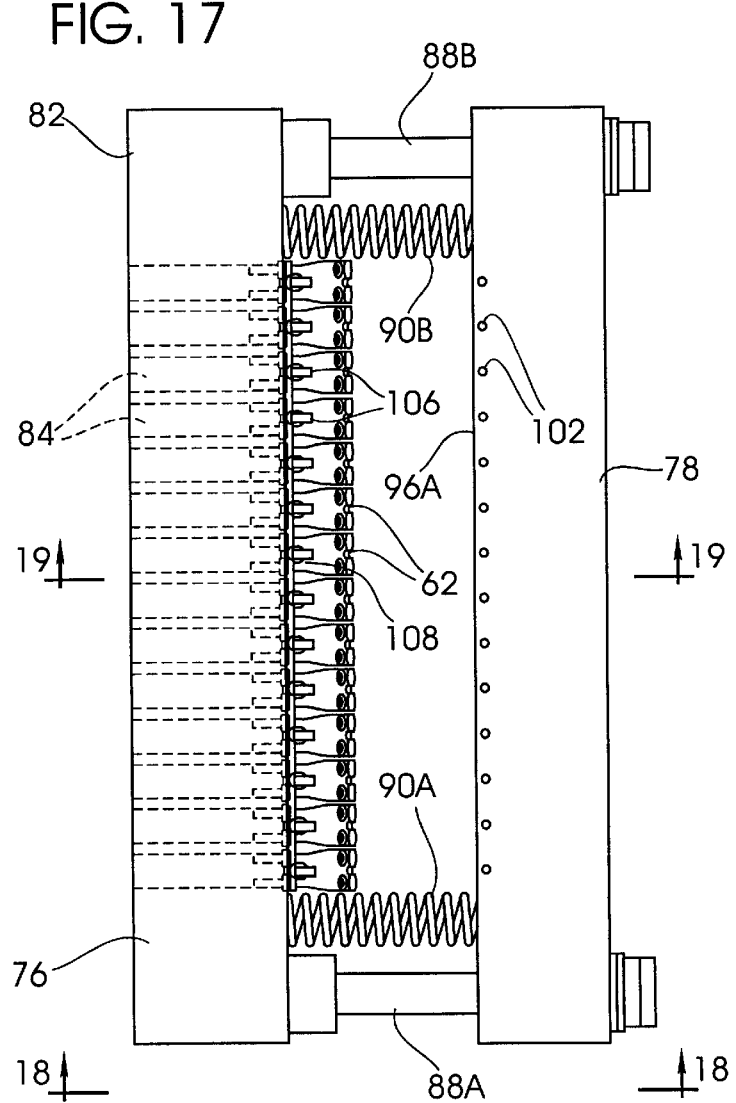

FIG. 17 is a top plan view of an assembly for attaching belt fasteners of the type illustrated in FIGS. 13–16 to the end of a belt.

Figure 18:
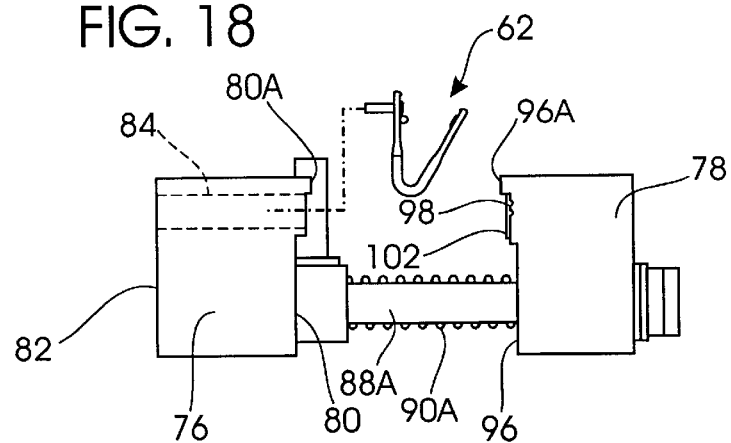

FIG. 18 is an elevational end view taken along the line 18—18 of FIG. 17.

Figure 19:
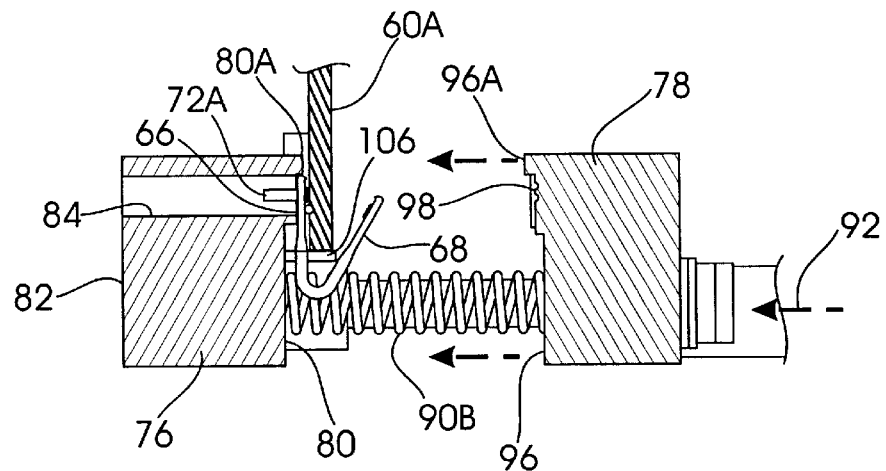

FIG. 19 is a cross-sectional view taken along the line 19—19 of FIG. 17. FIG. 19 shows belt fasteners as secured by the alignment member and shows the end portion of a wide flat belt positioned to have the belt fasteners secured to it.

Figure 20:
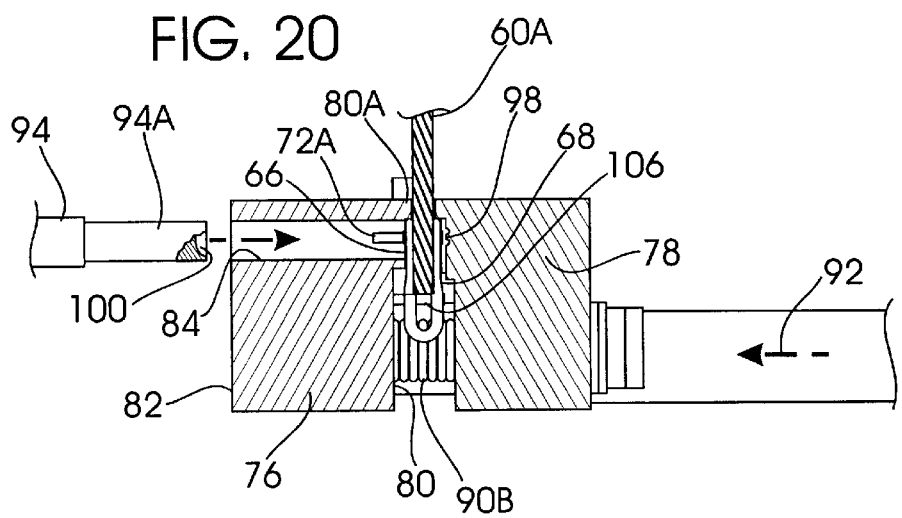

FIG. 20 is an elevational view as in FIG. 19 but showing the alignment member and anvil member forced towards each other and showing a punch as used to drive fastening wires through the belt and the opposed leg of each of the belt fasteners whereby the belt fasteners are secured to the end of the belt.

Figure 21:
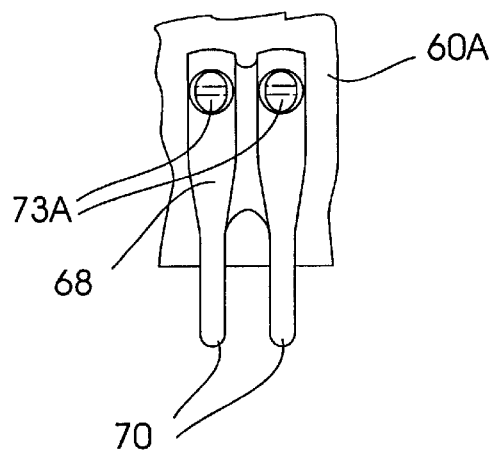

FIG. 21 shows the ends of fastner wires after they have been driven through the belt and through openings in the opposed leg of the belt fasteners, the ends of the fastener wires having been deformed and spread apart by engagement with the anvil member so that the belt fasteners are secured to the end of the belt.

Detailed Description of a Preferred Embodiment

The invention herein is an assembly for attaching U-shaped belt fasteners to the end of an elongated flat belt. The invention is particularly useful for repairing belts of the type utilized in farm equipment and particularly hay balers for baling large round bales of hay. For background information relating to the use of flat belts on hay balers and the basic technique for repairing belts of the type used on hay balers, reference should be had to U.S. Pat. No. 5,680,688. This patent, entitled "PORTABLE APPARATUS FOR AFFIXING A LACER TO A BELT" discloses the basic steps employed in repairing a belt and shows the use of jaws to support belt fasteners, the jaws being forced together by means of a hydraulic jack. The present invention is concerned with improved jaws used to support belt fasteners and an assembly by which belt fasteners can be expeditiously attached to the ends of a wide flat belt.

FIG. 1 is a top plan view showing the end portions 10A and 10B of a belt such as the type utilized in farming equipment. While this is an example of the application of the invention it is understood that the invention is not limited to repair belts for farm equipment but also may be used for repairing any wide flat belt that may be used for industrial purposes other than agriculture. The belt having end portions 10A and 10B is repaired to provide an endless belt by the use of belt fasteners 12. In FIG. 1, ten belt fasteners 12 are attached to belt end portion 10A and correspondingly ten belt fasteners 12 are attached to belt end portion 10B. Belt end portions 10A and 10B are secured to each other by means of a rod 14 that extends through bight portions of the belt fasteners, the rod 14 being bent at 14A at each end to prevent it from being displaced.

Figure 3:
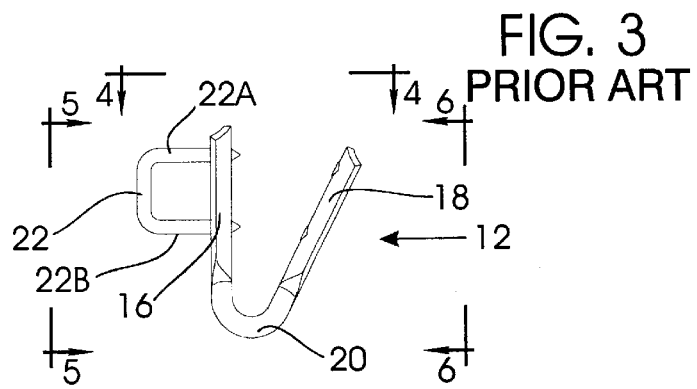
FIG. 3 is an elevational view of one form of belt fastener to which the present invention is directed.
Figure 4:
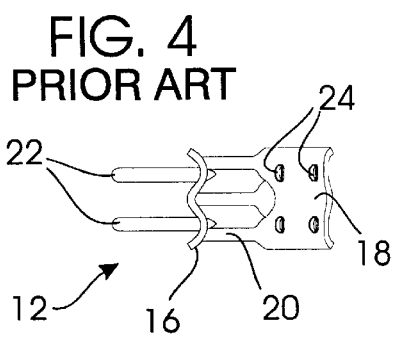
FIG. 4 is a top view of the belt fastener of FIG. 3 as taken along the line 4—4 of FIG. 3.
Figure 5:
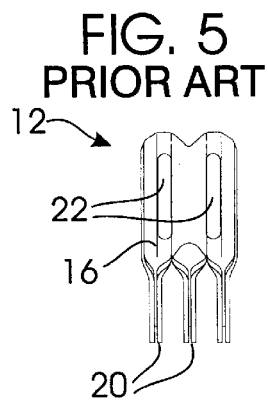
FIG. 5 is a front elevational view of a belt fastener as taken along the line 5—5 of FIG. 3.
Figure 6:
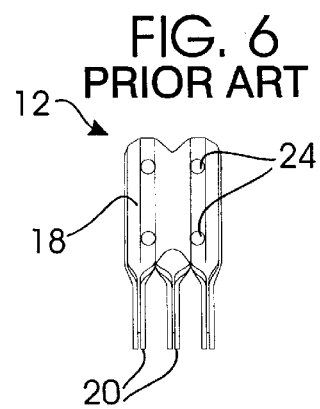
FIG. 6 is an elevational view of the opposite or rearward side of a belt fastener as taken along the line 6—6 of FIG. 3.

FIGS. 3–6 show details of the belt fasteners 12. As shown in FIG. 3 each belt fastener 12 is of a U-shaped configuration and has a first leg portion 16 and an opposed, second leg portion 18 with an integral bight portion 20 therebetween. Secured to first leg portion 16 are two fastening wires 22, only one of which is seen in FIG. 3. Each fastener wire 22 is of a staple configuration, that is, each fastening wire 22 is U-shaped and has opposed legs 22A and 22B, seen best in FIG. 3.

Second leg portion 18 has an opening 24 for each of the fastener wires. In the illustrated arrangement the second leg portion 18 of each of the belt fasteners has four openings 24.

Belt fasteners 12 as shown in FIGS. 1–6 is a readily available commercial product and this invention is not concerned with the configuration of this product. The invention provides an assembly by which the belt fasteners 12 of FIGS. 1–6 can be expeditiously attached to the end of a wide flat belt, the assembly being illustrated in FIGS. 7–10. FIG. 7 is a top plan view of the assembly major components which are an alignment member 26 and an anvil member 28. The alignment member 26 is an elongated metal component designed for use in horizontal orientation and has, as shown in FIGS. 8, 9 and 10, a forward face 30 that is vertically oriented having a forwardly extending longitudinal ledge 30A. Alignment member 26 has a rearward face 32. A plurality of spaced apart horizontally oriented fastener wire openings 34 extend from the rearward face 32 to forward face 30. Fastener wire openings 34 are dimensioned to receive the pairs of fastening wires 22 of belt fasteners 12 so that the belt fasteners 12 are supported with the first leg portion 16 contiguous with alignment member forward face 30, and the second leg portion 18 of each belt fastener 12 extending outwardly and upwardly as shown in FIG. 9.

Alignment member 26 and anvil member 28 are supported relative to each other by spaced apart rods 36A and 36B as seen in FIG. 7. Rods 36A and 36B are affixed to anvil member 28 and are slidably received in openings (not seen) in alignment member 26. The alignment member 26 and anvil member 28 are normally urged apart from each other by means of springs 38A and 38B. To secure belt fasteners 12 to the end of a belt alignment member 26 and anvil member 28 are forced towards each other. It is immaterial as to which is movable relative to the other only that they are forced towards each other which can be accomplished such as by means of a hydraulic jack. FIGS. 9 and 10 show an arrow 40 indicating force which may be supplied such as by a hydraulic jack or by other mechanical means to move anvil member 28 and alignment member 26 towards each other.

Anvil member 28 has an anvil face 42 that is parallel to alignment member forward face 30. Anvil face 42, as seen in FIGS. 8 and 9B has, along the top edge, an integral forwardly extending bead portion 44 and below it, a series of vertical spaced apart slots 46. Extending from a top surface 48 of anvil member 28 is a plurality of vertical openings 50, there being one vertical opening in alignment with each vertical slot 46 and with each of the fastening wires 22 received by alignment member 26.

When anvil member 28 is forced towards alignment member 26 as shown in FIG. 10 the second leg portion 18 of each of belt fastener 12 is bent to engage a surface of a belt 10A positioned between alignment member 26 and anvil member 28 and between the legs 16 and 18 of belt fasteners 12. After anvil member 28 is in position with respect to alignment member 26 as shown in FIG. 10, a punch 52 is driven into each of the fastener wire openings 34 in alignment member 26 to drive fastening wires 22 through belt 10A. FIG. 10 shows fastening wires 22 after they have been driven through belt 10A and through the openings in the belt fastener second leg portions. To secure belt fasteners 12 to the end of belt 10A the extending portions of fastener wires 22 are bent downwardly. This is accomplished by telescopically inserting a punch 54 vertically downwardly into each of vertical openings 50 to cause wires 22 to be bent into a downward position parallel to belt fastener second leg portion 18. FIG. 1 shows the appearance of belt fasteners 12 after having been attached to belt portions 10A and 10B with fastening wires 22 bent to retain fasteners 12 onto the belt.

Horizontal fastener wire openings 34 in alignment member 26 are, in cross-section, rectangular as seen in FIG. 9A. This arrangement permits each fastener wire opening 34 to receive two fastening wires 22. Punch 52 is rectangular at its outer end portion 52A as shown in FIG. 10A and has a unique outer end surface 52B providing for two paralleled vertical projections that serve to keep in alignment the vertical portions of the fastening wires 22 as they are driven through the belt.

After belt fasteners 12 have been secured to the end of belt 10A as shown in FIG. 10 the force 40 applied against anvil member 28 is removed and springs 38A and 38B urge these members apart and thereby permit the end portion 10A of the belt to be removed having belt fasteners 12 secured to it. The same procedure is employed for belt end portion 10B. The integral bight portion 20 of each belt fastener extends outwardly from an end of the belt to receive a rod 14 by which the ends of the belt are secured to each other, as shown in FIG. 1.

An application of the invention to apply an alternate style of belt fastener is disclosed in FIGS. 11–20. FIG. 11 shows end portions 60A and 60B of a wide flat belt, such as used on a round bale bay baler in which a plurality of belt fasteners 62 are secured to each of the belt end portions. Fourteen belts fasteners 62 are used on each of the belt portions 60A and 60B. The belt fasteners provide integral bight portions as will be described subsequently that receive a rod 64 by which the belt portions are secured to each other. The outer end portion 64A of the rod are bent to retain it in position.

FIGS. 13–16 illustrate belt fastener 62. FIG. 13 shows an elevational end view of a belt fastener 62 that has a first leg 66 and a second leg 68, the legs being spread apart in a generally U-shaped configuration. The legs are integrally joined to each other by a bight portion 70.

Extending from the first leg 66 are two fastening wires 72A and 72B. Second leg 68 has two openings 24 therein for receiving fastening wires 72A and 72B. Each fastener wire 72A, 72B has an inner end surface 73 as clearly seen in FIGS. 13 and 15.

The assembly for attaching the U-shaped belt fasteners 62 to belt end portions 10A and 10B include, as shown in FIGS. 17–20, an elongated alignment member 76 and an opposed anvil member 78. Anvil member 78 is elongated and of length substantially that of alignment member 76 and is parallel to and spaced from the alignment member. Alignment member 76 has a forward face 80 and, adjacent the top surface of the alignment member an integral forwardly extending longitudinal ledge 80A. Spaced from the forward face 80 of the alignment member is a rearward face 82. Extending from rearward face 82 to forward face 80 are a plurality (fourteen being shown) of fastener wire openings 84. Each of the openings 84 is of a diameter to receive a pair of fastening wires 72A and 72B of each belt fastener 62. The belt fastener 62 as illustrated in detail in FIGS. 13–16 are commercially available and not a part of this invention. Instead the invention is concerned with an assembly for attaching the belt fasteners 62 to a wide flat belt. In the commercial embodiment a plurality of belt fasteners, such as fourteen, are provided as an integral unit held together by a small attachment wire 86 (see FIG. 13). Wire 86 has no function in securing the ends of the belt together except to hold the belt fastener 62 together as a unit so that they are easily mounted on forward face 80 of alignment member 76. The entire assembly of belt fastener 62 are mounted simultaneously by inserting fastening wires 72A and 72B into openings 84. With belt fasteners 62 positioned on forward face 30 of the alignment member an end portion 60A of the belt may be inserted in the open, spread apart legs 66 and 68 of the belt fasteners as shown in FIG. 19.

Alignment member 76 and anvil member 78 are movable towards and away from each other by spaced apart rods 88A and 88B. Rods 88A and 88B are slidable in recesses within alignment member 76. Members 76 and 78 are normally urged apart by springs 90A and 90B. The anvil member can be moved towards the alignment member such as by means of a hydraulic jack (not shown) or any other element to apply a force as indicated by arrow 92. When force is applied, anvil member 78 moves to the position shown in FIG. 20, forcing second legs 68 of each belt fastener 62 against belt 60A. With anvil member 78 held in the position shown in FIG. 20 a punch 94 having a reduced diameter end portion 94A is then telescopically positioned in each opening 84 within alignment member 76 and by means of a hammer the fastener wire 72A and 72B are driven through belt 60A and through openings 74 in second leg portions of each of the belt fasteners.

Anvil member 78 has a forward face 96 that has, adjacent the upper surface thereof, an integral forwardly extending horizontal ledge 96A. Below ledge 96A is a longitudinal integral elongated bead 98 that provides a surface that is engaged by the inner end of each of the fastening wires 72A and 72B as they are driven forward by punch 94. Bead 98 cause the inner end of each of the fastener wires to be spread apart slightly to lock the inner end to a belt fastener second leg 68. FIG. 21 shows spread apart end surfaces 73A of the fastener wires after they have been driven against the bead on the anvil member face. Further, the inner end 100 of punch 94 has an arched or concave surface to cause the formation of an expanded head on the outer end of each of fastening wires 72A and 72B as they are driven in position. This bradding action serves to lock the fastener wires to the belt fasteners. After punch 94 has been inserted into each of the openings 84 and the fastener wires driven into position and bradded on their ends, anvil member 78 is withdrawn by removing force 92, permitting belt portion 60A with belt fasteners 62 securely attached to it to be removed. When fasteners 62 have been applied to the end of each of belt portion 60A and 60B they can be joined by use of rod 64 to complete the formation of an endless belt as used in agricultural hay balers and other agricultural and industrial applications.

To maintain good alignment of the belt fastener 62 small diameter vertical pins 102 are positioned on anvil member forward face 96. These pins mesh with recesses 104 (as seen in FIG. 16) in each belt fastener 62. The function of pins 102 is to insure proper alignment. In like manner pins 106 extend horizontally from alignment member forward face 80 between recesses 108 formed in both the first and second legs 66 and 68 of each belt fastener 62. Thus the vertical pins 102 and the horizontal pins 106 serve to maintain proper alignment of belt fasteners 62 during the attachment process.

The operation of the assembly for attaching U-shaped belt fasteners to the end of an elongated flat belt functions essentially the same for both commercially available types of belt fasteners, that is for the belt fastener 12 as a discussed in reference to FIGS. 1–9 and belt fasteners 62 as discussed with reference to FIGS. 10–20. The details of the alignment members 26 and 76 and anvil members 28 and 78 are adjusted to fit the specific belt fastener configurations. Whereas, to attach the belt fastener 12 as discussed in FIGS. 1–9 two punches are employed, that is, one punch to drive the fastener wires and a second punch to bend the fastener wires, in the arrangement of FIGS. 10–20 only a single punch 94 is employed which functions both to drive the fastener wires and to deform the ends so that they remain secured to the opposed legs of each belt fastener.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An assembly for attaching U-shaped belt fasteners to the end of an elongated flat belt, each of the belt fasteners having a first and an opposed second leg portion with an integral bight portion therebetween, each first leg portion having extending therefrom at least one fastening wire and each second leg portion having an opening therein for a fastening wire, the assembly comprising:

an elongated alignment member having a forward face and having, in a common plane, a plurality of closely spaced fastening wire openings communicating with said forward face, the first leg portion of each of a plurality of belt fasteners being detachably supportable in juxtaposed relationship to said alignment member forward face with at least one fastening wire of each belt fastener extending in a said fastening wire opening, the second leg portion of each of the plurality of belt fasteners extending outwardly and upwardly from said alignment member forward face;

an elongated anvil member positioned adjacent said alignment member and having a forward face facing parallel to said alignment member forward face, at least one of said alignment member and anvil member being movable towards the other, an end of an elongated flat belt being insertable between said forward face of said alignment member and said forward face of said anvil member and between first and second leg portions of belt fasteners supported by said alignment member, said anvil member having a top surface in a plane perpendicular to said forward anvil face, and including a plurality of bending openings therein in a plane spaced from and parallel to said forward anvil face and each bending opening being in a plane of a said alignment member fastening wire opening and including a plurality of vertical slots each communicating between said anvil member forward face and a said anvil member bending openings;

a first punch having a forward portion telescopically receivable within said fastening wire openings in said alignment member by which fastening wires are driven through a belt positioned between said alignment member and said anvil member and through openings in the said belt fasteners second leg portions; and through said slots and into said bending openings in said anvil member; and a second punch for telescopic insertion into said openings in said anvil member by which the fastening wires are bent down to attach the belt fasteners to the end of a flat belt.

2. An assembly for attaching belt fasteners to the end of a flat belt according to claim 1 including;

a force actuator for selectably moving one of said alignment member and said anvil member towards the other.

3. An assembly for attaching belt fasteners to the end of a flat belt according to claim 2 wherein said force actuator is a jack.

4. An assembly for attaching U-shaped belt fasteners to the end of an elongated flat belt, each of the belt fasteners having a first and an opposed second leg portion with an integral bight portion therebetween, each of the first and second leg portions having an opening therethrough for receiving an elongated fastening element, the assembly comprising:

an elongated alignment member having a forward face and having, in a common plane, a plurality of closely spaced fastening element openings communicating with said forward face, the first leg portion of each of a plurality of belt fasteners being detachably supportable injuxtaposed relationship to said alignment member forward face with a said opening of each belt fastener first leg portion in alignment with a said fastening element opening, the second leg portions of the plurality of belt fasteners extending outwardly and upwardly from said alignment member forward face;

an elongated anvil member positioned adjacent said alignment member and having a forward face facing said alignment member forward face, at least one of said alignment member and anvil member being movable towards the other, an end of an elongated flat belt being insertable between said forward faces of said alignment member and anvil member and between first and second leg portions of belt fasteners supported by said alignment members said anvil member forward face having a single integral, forwardly projecting elongated anvil lip;

a fastener element for each belt fastener receivable within a said fastening element opening in said alignment member and extendable through said opening in said first leg portion of each said fastener member, each fastener element having an inner end surface;

a force actuator for selectably moving one of said alignment member and said anvil member towards the other; and a punch having a forward portion telescopically sequentially receivable within said fastening element openings by which fastening elements are driven through a belt positioned between said alignment and anvil members and through openings in the belt fasteners leg portions, said integral, forwardly projecting anvil lip on said elongated anvil member vertical forward anvil face being configured to engage deform and enlarge or spread apart the cross-sectional area of said inner end surface of each of said fastener elements when driven by said punch to retain each said fastener element within said opening in said second leg portion of each said belt fastener to attach the belt fasteners to a belt.

5. An assembly for attaching belt fasteners to the end of a flat belt according to claim 4 wherein said force actuator is a jack.

6. An assembly for attaching U-shaped belt fasteners to the end of an elongated flat belt, each of the belt fasteners having a first and an opposed second leg portion with an integral bight portion therebetween, each first leg portion having extending therefrom at least one fastening wire and each second leg portion having an opening therein for a fastening wire, the assembly comprising:

an elongated alignment member having a plurality of closely spaced fastening wire openings;

an elongated anvil member positioned adjacent said alignment member, at least one of said alignment member and anvil member being movable towards the other, an end of an elongated flat belt being insertable between said alignment member and said anvil member and between first and second leg portions of belt fasteners; the anvil member having a plurality of bending openings therein;

a first punch telescopically receivable within said fastening wire openings in said alignment member by which fastening wires are driven through a belt positioned between said alignment member and said anvil member and through openings in the said belt fasteners second leg portions and into said bending openings in said anvil member; and a second punch telescopically receivable within said bending openings in said anvil member by which said fastening wires are bent down to attach said belt fasteners to the end of a flat belt.

* * * * *